(12) United States Patent
Yuksel

(10) Patent No.: US 8,621,623 B1
(45) Date of Patent: Dec. 31, 2013

(54) METHOD AND SYSTEM FOR IDENTIFYING BUSINESS RECORDS

(75) Inventor: Baris Yuksel, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/542,925

(22) Filed: Jul. 6, 2012

(51) Int. Cl.
*G06F 11/00* (2006.01)
*G06F 15/16* (2006.01)
*G06F 17/30* (2006.01)

(52) U.S. Cl.
USPC ................. 726/22; 709/206; 707/999.005

(58) Field of Classification Search
USPC ................. 726/22; 709/206; 707/999.05
See application file for complete search history.

(56) References Cited

U.S. PATENT DOCUMENTS

| | | | |
|---|---|---|---|
| 7,660,792 B2 | 2/2010 | Brewer et al. | |
| 7,873,635 B2 | 1/2011 | Wang et al. | |
| 7,890,957 B2 * | 2/2011 | Campbell | 719/313 |
| 8,001,195 B1 | 8/2011 | Kalinin | |
| 2003/0229672 A1 | 12/2003 | Kohn | |
| 2005/0015626 A1 | 1/2005 | Chasin | |
| 2007/0078939 A1 | 4/2007 | Kallen | |
| 2009/0077617 A1 | 3/2009 | Levow et al. | |
| 2009/0089285 A1 | 4/2009 | Donato et al. | |
| 2009/0089373 A1 | 4/2009 | Donato et al. | |
| 2009/0119268 A1 * | 5/2009 | Bandaru et al. | 707/3 |
| 2009/0307313 A1 | 12/2009 | Wang et al. | |
| 2010/0017476 A1 | 1/2010 | Shue et al. | |
| 2011/0087648 A1 | 4/2011 | Wang et al. | |
| 2011/0131280 A1 * | 6/2011 | Macwan et al. | 709/206 |
| 2011/0173191 A1 * | 7/2011 | Tsaparas et al. | 707/723 |

* cited by examiner

*Primary Examiner* — Techane Gergiso
(74) *Attorney, Agent, or Firm* — Lerner, David, Littenberg, Krumholz & Mentlik, LLP

(57) ABSTRACT

False or spam business listings may be identified by searching reviews associated therewith. The associated business reviews may be searched for one or more keywords that suggest the business listing is spam. Moreover, business listings may be categorized based on a type of business in the listing, and the associated reviews for business listings in each category may be searched for characteristics particular to that category. Further business reviews may be searched for hits matching portions of business reviews associated with known spam business listings. Once a business listing is identified as potential spam using these techniques, the listing may be flagged for further review.

12 Claims, 4 Drawing Sheets

METHOD AND SYSTEM FOR IDENTIFYING BUSINESS RECORDS

BACKGROUND

A strong web presence is vital to the success of modern businesses. In addition to the traditional marketing vehicle of a company web site, businesses are increasingly indexed with a variety of secondary sources. Examples of these secondary sources include search engines, mapping providers that provide directions to the place of business, review sites allowing users to rate their purchase experience, social networking sites that allow users to "link" to particular businesses to which they may be associated, and more. These secondary sources typically allow for business owners to make their business available via various searching and indexing methods. For example, a social networking site may allow a user to search for a particular type of business within a certain number of social "links" of the user, or a mapping provider may allow for the user to search for a particular business within a certain geographical radius.

However, by allowing business owners to submit their own records for listing, these secondary sites also provide an opportunity for malicious and opportunistic users to include false records. For example, a user may list a false store front in a major metropolitan area, including a link to a mail order service in another country, or a user may list a business purporting to sell authentic merchandise, when in fact the listing links to a site selling counterfeit goods. Even worse, many of these listings may link to malicious software and function as virus delivery vectors. These false record listings reduce the "signal-to-noise" ratio of search results and interfere with site usability.

SUMMARY

One aspect of the disclosure provides a computer implemented method for identifying business records. According to this method, one or more business listings having associated business reviews is provided and one or more keywords that suggest the business listing is spam is determined. The associated business listing reviews may be searched for hits matching the one or more keywords. The one or more business listings may be categorized, and the business reviews associated with each business listing in a given category are compared. Based on this comparison, characteristics of the business reviews that suggest the associated business listing is spam are determined, and the business reviews in the given category are searched for hits matching the determined characteristics. At least a portion of a business review associated with a known spam business listing is selected, and the one or more business listings are searched for hits matching the portion of the business reviews associated with the known spam business listing. A given one of the one or more business listings may be flagged as spam if at least one hit is found in the given listing's associated business reviews.

Another aspect of the disclosure provides a computer implemented method for identifying business records. According to this method, one or more business listings having associated business reviews is provided. A processor is used to analyze the associated business reviews to identify potential spam listings in the one or more business listings. Such analyzing may include searching the associated business listing reviews for one or more keywords that suggest the business listing is spam, categorizing the one or more business listings and searching the business reviews in each category for characteristics particular to that category, and searching the associated business listing reviews for hits matching portions of business reviews associated with known spam business listings.

Yet another aspect of the disclosure provides a system including a processor and a memory in communication with the processor. The memory may store information and instructions executable by the processor for performing a method of identifying business listings. Such method may include searching business reviews associated with one or more business listings for one or more keywords that suggest the business listing is spam, categorizing the one or more business listings, searching the business reviews associated with the business listings in each category for characteristics particular to that category, and searching the business reviews associated with the one or more business listings for hits matching portions of business reviews associated with known spam business listings.

DETAILED DESCRIPTION

The following disclosure provides for identifying false or spam business listings by mining reviews associated therewith. The associated reviews may be entered, for example, by any user capable of viewing the business listings, and the reviews may be stored in association with the business listings. The reviews may be searched for one or more keywords that suggest the business listing is spam. Moreover, the business listings may be categorized based on a type of business, and the associated reviews for the business listings in each category may be searched for characteristics particular to that category, such as uncommon or irrelevant terms. Further the reviews may be searched for hits matching portions of business reviews associated with known spam business listings. Once a business listing is identified as potential spam using these techniques, the listing may be flagged for further review.

Figure 1:
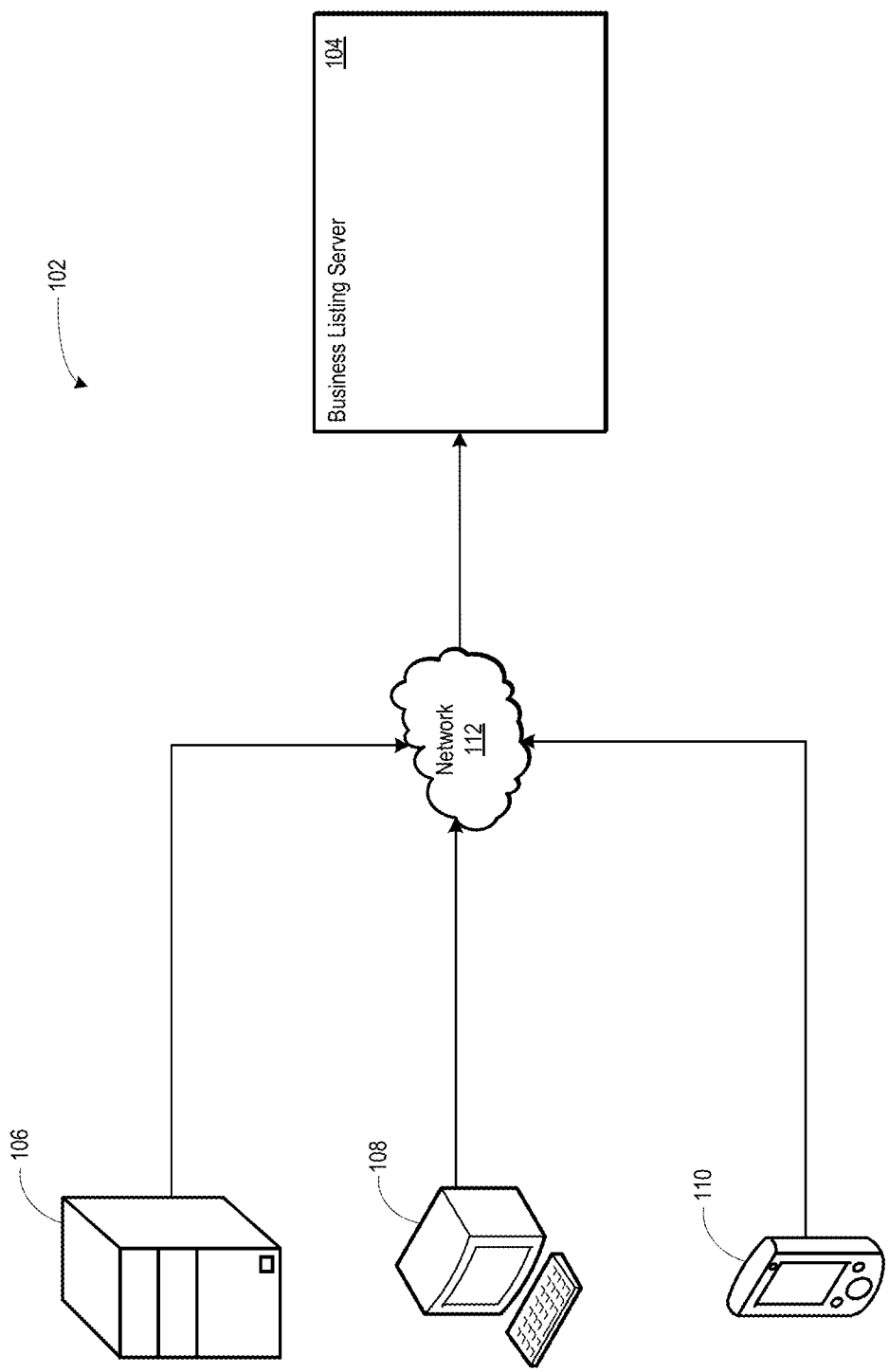
FIG. 1 is a system diagram depicting an example system for detecting spam business listings in accordance with aspects of the disclosure.

FIG. 1 illustrates one example of a system 102 for identifying business records. The system 102 may include a business listing server 104 in communication with client devices 106-110 via a network 112. The business listing server 104 maintains records which define a set of business listings. A business listing may include many different types of information about the business, such as the business' title (e.g., corporate business name ("Google, Inc."), informal business name ("Google"), etc.), the business' phone number, a URL for the business, a description of the business, hours of operation, or any other type of information about the business.

The client devices 106-110 may include a variety of types of computing devices. For example, the client devices 106-110 may include desktop computers, servers, mobile device, such as a laptop, a smart phone, a Personal Digital Assistant ("PDA"), a tablet computer, or other such mobile devices, or any other type of computing device. While a single computing device is shown for each of the client devices 106-110, each client device may actually include a plurality of interconnected computing devices of a same or various types. The client devices 106-110 may be any system or other provider that communicates with the business listing server 104 to retrieve and/or request one or more business listings. Moreover, the client devices 106-110 may run different applications and be used for a variety of different purposes. For example, the client devices 106-110 may be used by Internet search providers, social network providers, local search providers, map service providers, navigation assistance providers, or any other type of service provider. Alternatively, the client devices 106-110 may be used by users of any of these services. According to some examples, the business listing server 104 may provide business listings of a type and in a manner relevant to the type of client device. For example, the Internet search provider 106 may receive a search query from a user, and the Internet search provider 106 may communicate with the business listing server 104 to include one or more business listings in the search results that the Internet search provider 106 may provide to the user.

When a business listing is requested from the business listing server 104, the business listing server 104 may transmit a response that includes a business listing. In some examples, the business listing server 104 may be operative to transmit a select portion of the business listing to a requesting party.

The network 112 may be implemented as any combination of networks. As examples, the network 112 may be a Wide Area Network ("WAN"), such as the Internet; a Local Area Network ("LAN"); a Personal Area Network ("PAN"), or a combination of WANs, LANs, and PANs. Moreover, the network 112 may involve the use of one or more wired protocols, such as the Simple Object Access Protocol ("SOAP"); wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of network protocol.

Figure 2:
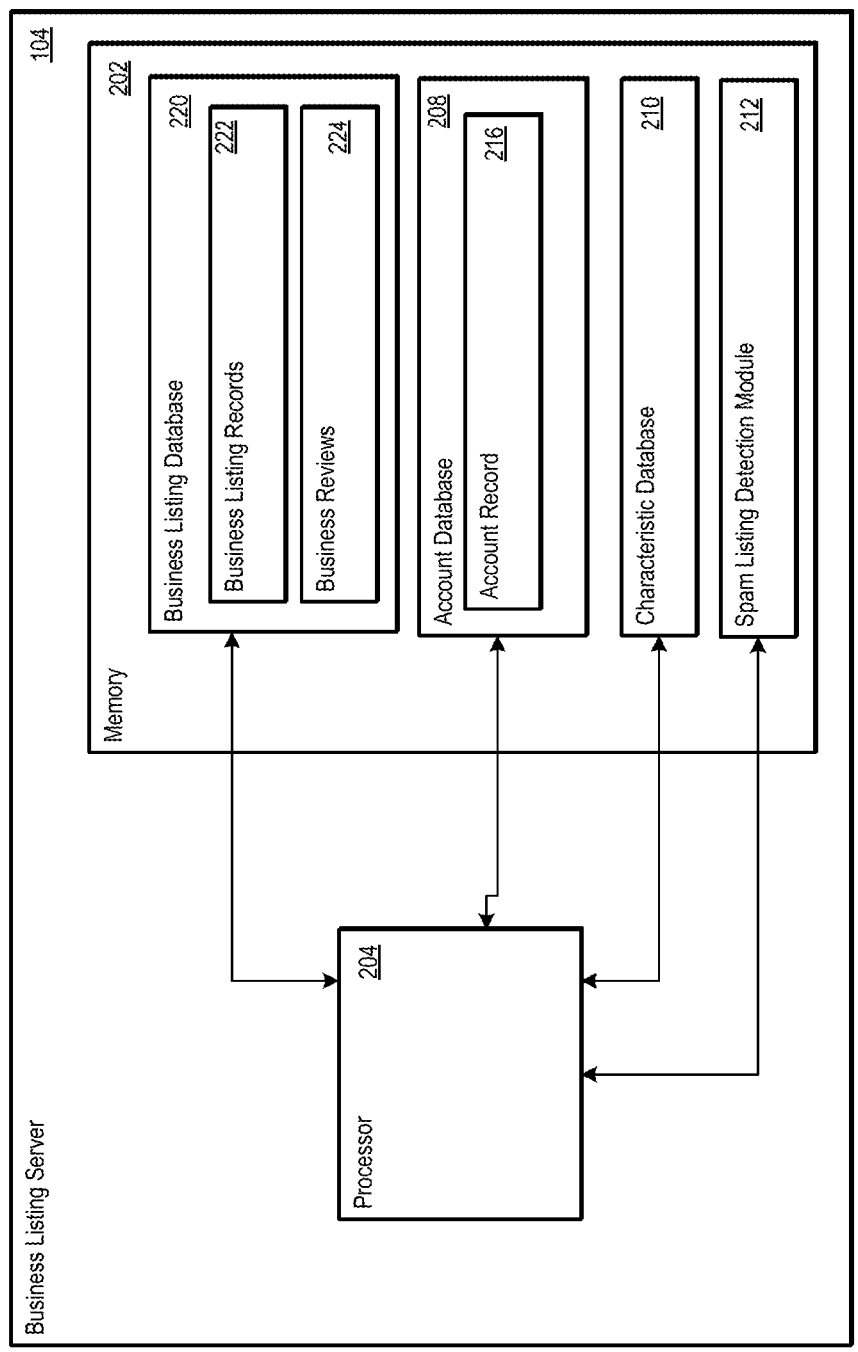
FIG. 2 is a block diagram depicting an example business listing server in accordance with aspects of the disclosure.

FIG. 2 is one example of the business listing server 104. The business listing server 104 may include a memory 202 in communication with a processor 204. The memory 202 may be operative to store a business listing database 220, an account database 230, a characteristic database 240, and a listing identification module 250.

The business listing database 220 may store one or more business listing records 222. A business listing record 222 may include information about the business, such as the business' title, the business' phone number, the description about the business, the business' postal address, the URL for the business' website, the business' hours of operation, or other such business information.

The business listing database 220 may also include business reviews 224. Each business review may be associated with one or more of the business listing records 222. The business listing reviews 224 may include critiques or other information provided by a third party, such as users of the client devices 106-110, regarding particular business listings. For example, a business listing record for "Joe's Pizza" may be associated with a business review from a first network user that says "This pizza is delicious!" The same business listing record may be associated with a business review from a second network user that says "This location is closed." The business reviews 224 may be input by the third parties at a particular web site, such as Google Maps or yelp!, or any other platform which provides business listings to the third party.

A business listing record 222 may be associated with one or more owner accounts. For example, one may communicate with the business listing server 104 to establish the business listing record 222. For example, the owner may fill out a form, such as an online form, a paper form, or combination thereof, and provide the business listing information that business listing server 104 uses to establish the business listing record 222. Moreover, the owner may have established multiple business listings with the business listing server 104. In other words, more than one business listing record 222 may be associated with one owner account.

The account database 230 may store a plurality of account records 232. An account record 232 may comprise a unique identifier for each account owner. The owner may log in using the identifier for the purpose of posting business listing records to the business listing database 220. Such accounts may be freely available such that any user may post a business record listing, or they may be provided on a subscription basis. For example, a business owner may pay a fee to list their business with a particular advertiser or listing service for marketing purposes.

The business listing server 104 may further comprise a characteristic database 240. The characteristic database 240 stores information which may be used to detect spam business listings by analyzing their associated business reviews. Examples of such information include keywords 242, categories of business listings 244, and known spam listings and association information 246.

The keywords 242 may include a variety of different keywords which, if found in a business review, suggest that the business listing associated with the review may be spam. Examples of such keywords include "spam," "closed," "no store," etc. According to some examples, the database of keywords 242 may be modified in accordance with successful or unsuccessful searches, for example, to add or remove keywords. For example, if it is found that "closed" produces mostly hits in reviews for valid business listings that are not spam, this term may be removed.

The categories of business listings 244 may correlate particular business listing records 222 by type of business. For example, the type of business listing may relate to the services expected to be provided by the business or other information associated with the business. Examples of business listing categories may include locksmiths, appraisers, equipment rental, auto repair, auto sales, electricians, restaurants, clubs or non-profit organizations, or the like. According to one example, each business listing or an identifier for the business listing may be stored in association with the category or categories they relate to.

The known spam listings and associated information 246 may store a set of business listings previously identified as spam, or select information from those spam business listings or reviews of those spam business listings. For example, business reviews for businesses previously identified as spam may be stored in the known spam listings 246. These reviews may then be compared to reviews for other business listings, as explained in further detail below.

The business listing server 104 may also include a listing identification module 250. The listing identification module 250 executes logic to identify particular business records stored within the business listing database 220. For example, the listing identification module 250 may access the characteristic database 240 to identify various characteristics of potential spam listings. The listing identification module 250 then uses various techniques, such as, but not limited to, similarity calculations and machine learning methods to identify business listings having associated reviews which include such characteristics. While the listing identification module 250 is described herein as an element of the business listing server 104 executing on the processor 204, similar logic could be executed by a separate computing device in a networked environment, using an application-specific interface circuit (ASIC) or field-programmable gate array (FPGA), or the like.

The business listing server 104 described above may be implemented in a single system or partitioned across multiple systems. In addition, the memory 202 may be distributed across many different types of computer-readable media. The memory 202 may include random access memory ("RAM"), read-only memory ("ROM"), hard disks, floppy disks, CD-ROMs, flash memory or other types of computer memory.

The business listing database 220, the account database 230, the characteristic database 240, and the listing identification module 250 may be implemented in a combination of software and hardware. For example, the listing identification module 250 may be implemented in a computer programming language, such as C# or Java, or any other computer programming language. The listing identification module 250 may also be implemented in a computer scripting language, such as JavaScript, PHP, ASP, or any other computer scripting language now known or later developed. Furthermore, the listing identification module 250 may be implemented using a combination of computer programming languages and computer scripting languages.

In addition, the business listing server 104 may be implemented with additional, different, or fewer components. As one example, the processor 204 and any other logic or component may be implemented with a microprocessor, a microcontroller, a DSP, an application specific integrated circuit (ASIC), discrete analog or digital circuitry, or a combination of other types of circuits or logic. The business listing database 220, the account database 230, and the characteristic database 240, and the listing identification module 250 may be distributed among multiple components, such as among multiple processors and memories, optionally including multiple distributed processing systems.

The business listing database 220 and the account database 230 may be stored as a collection of data. For instance, although the business listing database 220 and the account database 230 are not limited by any particular data structure, the business listing database 220 and the account database 230 may be stored in computer registers, as relational databases, flat files, or any other type of database.

Figure 3:
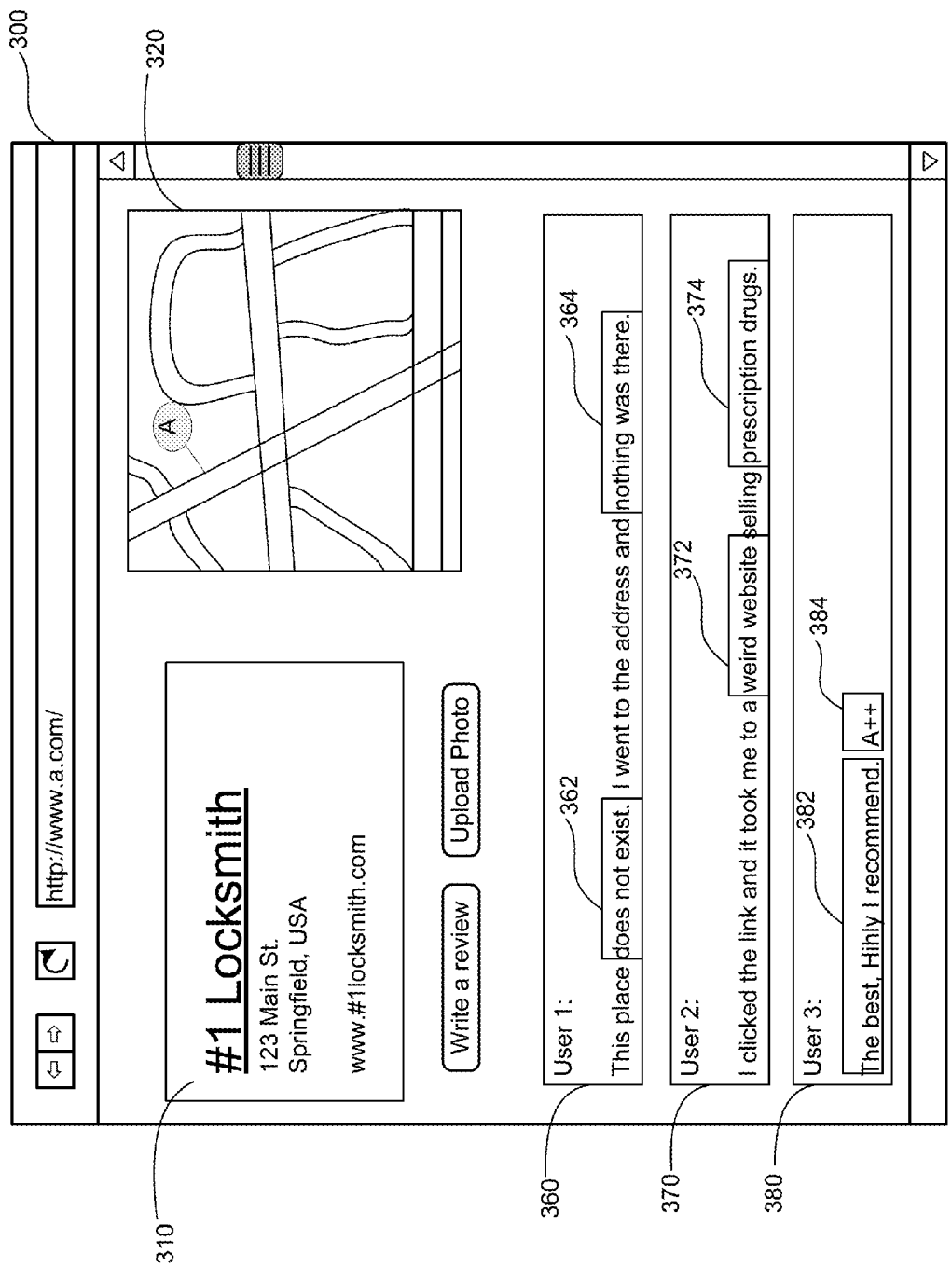
FIG. 3 is an example screen shot illustrating a business listing and reviews in accordance with aspects of the disclosure.

FIG. 3 illustrates an example screenshot 300 of a web site providing a business listing 310 and associated reviews 360, 370, 380. The web site may also provide further information associated with the business listing 310, such as a map 320 of its location, a picture (not shown) of the business's goods or services, advertisements (now shown) for related goods or services, or the like.

The business listing 310 may include the business's name, address, phone number, fax number, a link to its web site, or any other information related to the business. For example, as shown in FIG. 3, the business listing 310 includes business name "#1 Locksmith," an address, and a link to a website. Accordingly, a viewer who, for example, entered a search query for "locksmith" may be provided with this business listing 310 as a search result. In some examples, the location of the business may also be shown on the map 320.

The reviews 360, 370, 380 may be provided by any user with access to the web site. The user may enter text providing their opinions or other information relating to the business listing. In the example of FIG. 3, three reviews are provided by such users, although any number of reviews may be provided. In the review 360, User 1 provides: "This place does not exist. I went to the address and nothing was there." User 2 provides: "I clicked the link and it took me to a weird website selling prescription drugs." User 3 provides: "The best, Hihly I recommend. A++." According to some examples, the user may also enter a rating, personal information, such as a user name, profile picture, location city, etc., or any other information that may differentiate the reviews 360-380 or provide helpful information to other viewers of the business listing 310.

The reviews 360-380 may be mined in order to determine whether the associated business listing 310 could be illegitimate or "spam." The mining may consider various aspects of the reviews. For example, the reviews may be searched for particular keywords that are expected to appear in valid reviews of business listings, or alternatively that are not expected to appear in valid reviews. Moreover, the reviews may be compared to other reviews, such as reviews for known spam business listings.

One aspect of the data mining technique may include searching for particular words or phrases within a business review that may indicate that the business listing is spam. For example, such terms may include: "spam," "doesn't exist," "scam," "business is fake," "not legit," "nothing there," etc. It should be understood that these terms are merely examples, and that the search terms may include many various terms. Referring to the example of FIG. 3, the key term search may produce hits 362 and 364.

According to some aspects, once a key term search hit has been found in a first review, other reviews associated with that business listing may also be analyzed. For example, variations of the terms in hits 362, 364 may be included in the search. Moreover, other business listings may be searched using the terms in the hits 362, 364.

Another aspect of the data mining technique may include considering a category or type of the business listing 310 in relation to the text in the reviews 360-380. For example, reviews for a locksmith should all be related to opening doors, changing locks, etc. Accordingly, a plurality of reviews within a particular business category may be compared to determine a frequency with which particular words or phrases typically appear in the reviews. The spam business listings may be those with reviews containing words that do not typically appear in valid reviews or that only appear infrequently in valid reviews. Some examples of words that do not typically appear in valid business listings reviews or that only appear infrequently in such reviews may be "closed" or "doesn't exist." Further examples may include terms that are completely unrelated to the business category. For example, terms such as "replica watch" or "prescription drugs" or "Rihanna" do not frequently occur in valid locksmith business reviews. As shown in the example of FIG. 3, the infrequently appearing terms in the review 370 for a locksmith business may be "weird website" and "prescription drugs" in hits 372, 374.

Yet another aspect of the data mining technique may include comparing business reviews to reviews for business listings known to be spam. Often, spam business listing owners create a plurality of spam business listings, and may provide the same reviews for each. Moreover, certain terms may appear far more frequently in spam business listing reviews than in valid or non-spam business listings reviews. For example, the phrase "A++" may appear far more frequently in spam business reviews than in non-spam business reviews, and is therefore identified as a hit 384 in the review 380. Further, because many spam listing owners simply copy and paste reviews for each of their multiple spam listings, the multiple reviews may share misspellings, grammatical errors, and other identifiable attributes. For example, the phrase "The best, Hihly I recommend" in review 380 includes improper punctuation, improper capitalization, a misspelling, and an unusual ordering of words. If this phrase appears in a known spam listing, the same phrase may be identified in the review 380 as a hit 382.

Once the hits 362, 364, 372, 374, 382, 384 have been identified, the business listing 310 associated with the hits may be flagged as potential spam. According to some aspects, a points or rating system may be used to grade the likelihood of a given business listing being spam. For example, a point may be given for each hit, wherein a greater number of points indicates a higher likelihood of a business listing being spam. Further, particular types of hits may be associated with a greater point value. For example, a hit corresponding to the appearance of an infrequent term such as the hit 372 may be associated with one point, whereas a hit clearly copied from a known spam listing, such as the hit 382, may be associated with several points. If the number of hits associated with the reviews of a business listing exceeds a threshold, the business listing may be marked as spam. Alternatively, if any hit is found in the reviews associated with a business listing, that business listing may be sent for manual review.

Figure 4:
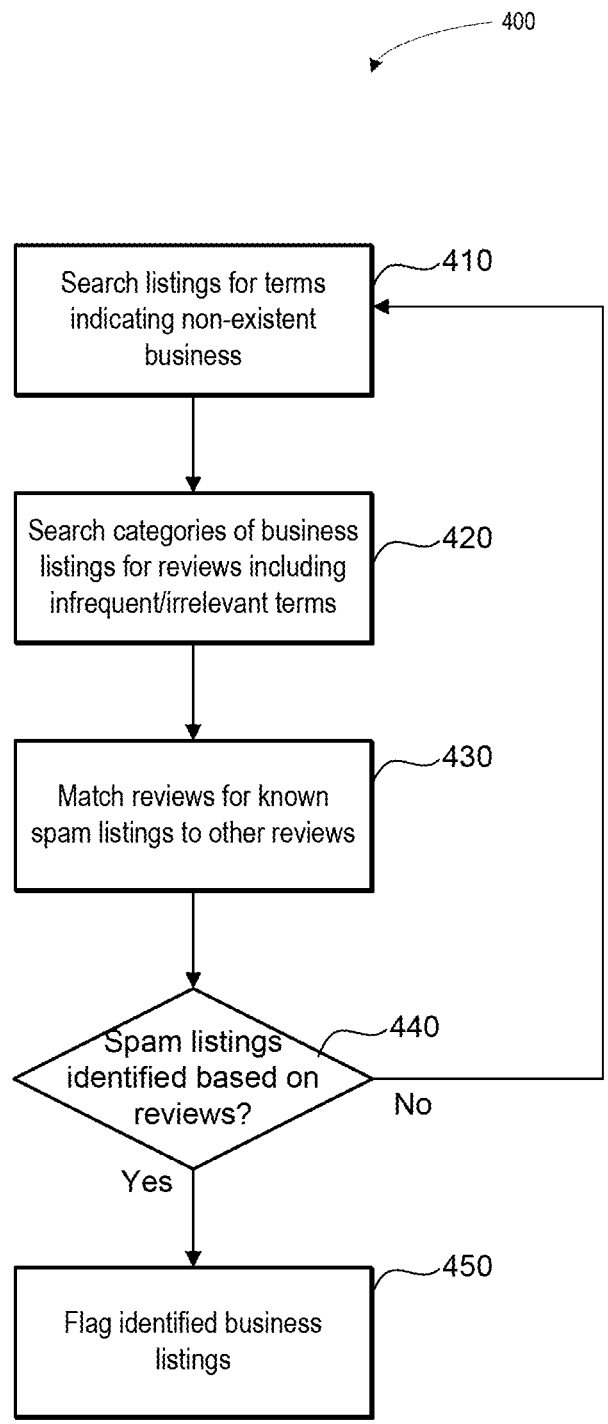
FIG. 4 is a flow diagram depicting a method for identifying a business record in accordance with aspects of the disclosure.

FIG. 4 illustrates a method 400 for identifying spam business listings. While various stages of the method are illustrated and described in a particular order, it should be understood that these stages do not have to be performed in this order. Rather, various stages may be handled in a different order or simultaneously, and stages may also be added or omitted unless otherwise stated.

In block 410, business listing reviews may be searched for phrases indicating the subject of the business reviews does not exist. For example, phrases such as "business is spam," "does not exist," "no physical location," or any other phrase that suggests that a business listing is spam may be searched. The searching may be performed using any tool capable of identifying given phrases within the business listings database. According to one aspect, particular phrases that are more successful in identifying spam may be used to search other reviews, for example, reviews in another database, for that business or other businesses. Moreover, variations of successful terms may be used to identify more hits. For example, if a search for "nothing there" returned a number of hits, terms such as "not there," "no business there," "no store there," or "there was nothing" may be searched.

In block 420, business listing reviews may be analyzed on a categorical basis, and business reviews that include terms that are infrequently used in reviews of businesses in that category may be identified. The categories of business listing may be defined by the types of businesses, such as locksmiths, restaurants, hotels, jewelry stores, shoe repair shops, churches, clubs or associations, etc. Reviews of business listings in the same category are expected to have similar features, such as word counts, and therefore include similar terminology. For example, a review of a business in the restaurants category would be expected to include terms relating to food or service. Accordingly, business listing reviews within a particular category may be compared to identify terminology that frequently appears in the reviews as well as terminology that infrequently appears in the reviews. For example, the most infrequent terms in appearing in reviews in a given category may be "closed" or "scam" or "sell your gold jewelry." According to some aspects, it may be determined whether infrequently appearing terms in business listing reviews are irrelevant to the category of the business listing or otherwise suggest that the business listing is spam. For example, the terms may be compared to a list of predefined relevant terms, or the terms may be reviewed by an operator. Reviews for business listings within that category may then be searched for infrequently appearing terms that have been determined to be not relevant to the business category and that therefore indicate the business listing is spam.

In block 430, reviews for known spam business listings may be matched against other business listing reviews. For example, business listings previously identified as spam may be stored in a database along with their associated reviews, or otherwise marked for identification as confirmed spam. The reviews for these known spam business listings may be compared to reviews for other business listings to determine if there is any correlation between the reviews. For example, sometimes a spam listing will include reviews entered by the spam business listing owner. Such reviews may encourage viewers to interact with the spam business listing, for example, by clicking on an embedded URL link in the review, sending an e-mail to an included address, calling a particular phone number, etc. If the spam business listing owner owns more than one spam listing, it is probable that the owner has entered similar reviews for his or her other spam listings that contain similar embedded URL links, email addresses or phone numbers. Moreover, the reviews entered by the spam owner may simply be "cut and paste" from one spam listing to the next. Therefore, characteristic features of the reviews such as improper spelling, grammar, and punctuation may also be compared and used to identify reviews of spam business listings. Accordingly, by comparing the reviews to known spam listing reviews, further spam listings may be identified.

In block 440, it may be determined whether any potential spam business listings were identified based on the searching in blocks 410-430. Business listings may be scored by the number of hits they contain, where a hit is the appearance of a term in a review of the business listing that infrequently appears in reviews of valid business listings, or the appearance of terms in a review of the business listing that are characteristic of reviews of spam business listings, or the appearance of embedded links or phone numbers in a review of the business listing that are found in reviews of confirmed spam listings. If too few hits are found in the reviews of a given business listing in any of blocks 410-430 (i.e., if the number of hits is less than a threshold), the method 400 may return to block 410 for further searching on reviews of additional business listings. The further searching may be performed at a later time, such as after a day, a week, a month etc. Alternatively or additionally, the further searching may utilize different search criteria, such as different keywords, different infrequently appearing terms in a category, and/or different selections from known spam listing reviews. Moreover, the further searching may be performed on a different selection of documents, such as a different business listing category.

If a business listing is identified as potential spam, the listing may be flagged for review in block 450. For example, the listing may be sent to an operator for manual review, and the operator can determine whether the listing is actually spam or not. For example, the operator may make the determination based on reading the listing and reviews, investigating the information associated with the listing, personal knowledge, etc. According to another example, the business listing may be rated or ranked based on the number and/or types of hits identified in the associated reviews. For example, points may be given for each hit, and some types of hits, such as matches to a keyword search for "spam" may be associated with a greater point value. These are merely examples, and any mechanism for flagging the identified listings or further evaluating the identified listings may be used. In some examples, an indication may be provided to viewers of the flagged business listing to signify that the listing is potentially spam and/or requesting that the viewer provide input regarding whether the listing is spam. Once it is verified by operator review or otherwise that a business listing is spam, the business listing record may be removed from the business listing database.

The disclosure above advantageously provides for the detection of spam business records. By identifying these records, they may then be filtered out of the business listing server, thus improving the quality of the results provided by the listing server. By searching the reviews associated with a business listing, information that may not otherwise be available at the business listing server, such as first-hand accounts of interactions with the business listing, may be utilized. Moreover, by performing several different types of searches using the reviews, a likelihood of identifying spam business listings is significantly increased.

Although aspects of the disclosure herein have been described with reference to particular examples, it is to be understood that these examples are merely illustrative. Numerous modifications may be made to the illustrative examples and other arrangements may be devised without departing from the spirit and scope of the subject matter as defined by the appended claims. Furthermore, while certain operations and functions are shown in a specific order, they may be performed in a different order unless it is expressly stated otherwise.

The invention claimed is:

1. A computer implemented method for identifying business records, the method comprising:
    receiving a plurality of reviews for a business listing in a business category;
    analyzing the plurality of reviews, and incrementing a spam count upon identifying one or more of the following in the reviews: terms that match terms in a list of spam keywords, terms that infrequently appear in reviews of valid businesses in the business category, misspellings or grammatical errors that are found in reviews of previously identified spam business listings, or contact information that is found in reviews of previously identified spam business listings; and
    flagging the business listing as spam if the spam count is greater than a threshold.

2. The method of claim 1, wherein incrementing the spam count upon identifying terms that infrequently appear in reviews of valid businesses in the business category, further comprises:
    determining whether an infrequently appearing term in one of the plurality of reviews is related to the business category; and
    incrementing the spam count only when the infrequently appearing term is not related to the business category.

3. The method of claim 2, further comprising adding the infrequently appearing term to the list of spam keywords.

4. The method of claim 3, further comprising:
    determining one or more variants of the infrequently appearing term; and
    adding the one or more variants to the list of spam keywords.

5. The method of claim 1, wherein the contact information includes at least one of an embedded URL link, a phone number, or an email address.

6. The method of claim 1, wherein incrementing the spam count further comprises incrementing the spam counts by different amounts based on identifying in the reviews: terms that match terms in a list of spam keywords, terms that infrequently appear in reviews of valid businesses in the business category, misspellings or grammatical errors that are found in reviews of previously identified spam business listings, or contact information that is found in reviews of previously identified spam business listings.

7. A system, comprising:
    one or more processors; and
    one or more memories in communication with the one or more processors, the one or more memories storing information and instructions executable by the one or more processors for performing a method of identifying business listings, the method comprising:
    receiving a plurality of reviews for a business listing in a business category;
    analyzing the plurality of reviews, and incrementing a spam count upon identifying one or more of the following in the reviews: terms that indicate a spam business listing; terms that infrequently appear in reviews of valid businesses in the business category, misspellings that are common to reviews of previously identified spam business listings or grammatical errors that are common to reviews of previously identified spam business listings; and
    flagging the business listing as spam if the spam count is greater than a threshold.

8. The system of claim 7, wherein incrementing the spam count upon identifying terms that infrequently appear in reviews of valid businesses in the business category, further comprises:
    determining whether an infrequently appearing term in one of the plurality of reviews is related to the business category; and
    incrementing the spam count only when the infrequently appearing term is not related to the business category.

9. The system of claim 8, further comprising adding the infrequently appearing term to the list of spam keywords.

10. The system of claim 9, further comprising:
    determining one or more variants of the infrequently appearing term; and
    adding the one or more variants to the list of spam keywords.

11. The system of claim 7, wherein the contact information includes at least one of an embedded URL link, a phone number, or an email address.

12. The system of claim 7, wherein incrementing the spam count further comprises incrementing the spam counts by different amounts based on identifying in the reviews: terms that match terms in a list of spam keywords, terms that infrequently appear in reviews of valid businesses in the business category, misspellings or grammatical errors that are found in reviews of previously identified spam business listings, or contact information that is found in reviews of previously identified spam business listings.

* * * * *